United States Patent
Aihara et al.

(10) Patent No.: US 10,811,726 B2
(45) Date of Patent: Oct. 20, 2020

(54) SOLID ELECTROLYTE FOR ALL-SOLID LITHIUM SECONDARY BATTERY, ALL-SOLID LITHIUM SECONDARY BATTERY, AND METHOD OF PREPARING THE SOLID ELECTROLYTE

(71) Applicant: Samsung Electronics Co., Ltd., Suwon-si, Gyeonggi-do (KR)

(72) Inventors: Yuichi Aihara, Kanagawa (JP); Tomoyuki Tsujimura, Kanagawa (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 173 days.

(21) Appl. No.: 16/180,552

(22) Filed: Nov. 5, 2018

(65) Prior Publication Data
US 2019/0148769 A1  May 16, 2019

(30) Foreign Application Priority Data

Nov. 14, 2017 (JP) ................ 2017-219084
Oct. 26, 2018 (KR) ............ 10-2018-0129354

(51) Int. Cl.
*H01M 10/0562* (2010.01)
*H01M 10/0525* (2010.01)
(Continued)

(52) U.S. Cl.
CPC ........ *H01M 10/0562* (2013.01); *H01M 4/13* (2013.01); *H01M 4/364* (2013.01); *H01M 4/5815* (2013.01); *H01M 10/0525* (2013.01); *H01M 10/0561* (2013.01); *H01M 10/0585* (2013.01); *H01M 4/505* (2013.01); *H01M 4/525* (2013.01); *H01M 2004/028* (2013.01); *H01M 2300/008* (2013.01)

(58) Field of Classification Search
CPC .............. H01M 10/0561; H01M 10/0562
USPC ..................................... 429/323
See application file for complete search history.

(56) References Cited

U.S. PATENT DOCUMENTS 8,075,865 B2   12/2011   Deiseroth et al.
8,962,194 B2   2/2015   Senga et al.
(Continued)

FOREIGN PATENT DOCUMENTS

JP   2011096630 A   5/2011
JP   2012104279 A   5/2012
(Continued)

OTHER PUBLICATIONS

Hao Min Chen et al., "Stability and ionic mobility in argyrodite-related lithium-ion solid electrolytes", Physical Chemistry Chemical Physics, Published on May 29, 2015, pp. 16494-16506, vol. 17, Issue 25.
(Continued)

*Primary Examiner* — James M Erwin
(74) *Attorney, Agent, or Firm* — Cantor Colburn LLP

(57) ABSTRACT

A solid electrolyte for an all-solid secondary battery, wherein the solid electrolyte has a composition represented by Formula (1):

$$Li_{7-x}PS_{6-x}Br_x \quad (1)$$

wherein $1.2 < x < 1.75$, the solid electrolyte has an argyrodite crystal structure, and the solid electrolyte has at least one peak at a position of a $29.65 \pm 0.50°$ $2\theta$ when analyzed by X-ray diffraction using CuKα radiation.

25 Claims, 3 Drawing Sheets

(51) Int. Cl.
H01M 4/36 (2006.01)
H01M 4/58 (2010.01)
H01M 4/13 (2010.01)
H01M 10/0585 (2010.01)
H01M 10/0561 (2010.01)
H01M 4/525 (2010.01)
H01M 4/02 (2006.01)
H01M 4/505 (2010.01)

(56) References Cited

U.S. PATENT DOCUMENTS

| | | | |
|---|---|---|---|
| 8,993,176 | B2 | 3/2015 | Kato et al. |
| 9,484,597 | B2 | 11/2016 | Ohtomo |
| 9,748,603 | B2 | 8/2017 | Yamasaki et al. |
| 9,806,373 | B2 | 10/2017 | Kambara et al. |
| 9,812,734 | B2 | 11/2017 | Miyashita et al. |
| 9,899,701 | B2 | 2/2018 | Miyashita et al. |
| 2011/0081580 | A1 | 4/2011 | Stadler et al. |
| 2015/0333368 | A1* | 11/2015 | Kato ............... H01M 10/0562 429/323 |
| 2017/0008808 | A1 | 1/2017 | Yanagi |
| 2017/0162901 | A1 | 6/2017 | Chen et al. |

FOREIGN PATENT DOCUMENTS

| | | | |
|---|---|---|---|
| JP | 2013016423 | A | 1/2013 |
| JP | 2013201110 | A | 10/2013 |
| JP | 2014029796 | A | 2/2014 |
| JP | 2015072783 | A | 4/2015 |
| JP | 2015088226 | A | 5/2015 |
| JP | 2016024874 | A | 2/2016 |
| JP | 5957144 | B2 | 7/2016 |
| JP | 2017018872 | A | 1/2017 |
| JP | 2017045613 | A | 3/2017 |
| JP | 6139864 | B2 | 5/2017 |
| WO | 2005078740 | A1 | 8/2005 |
| WO | 2012011179 | A1 | 1/2012 |
| WO | 2009047254 | A2 | 2/2014 |
| WO | 2015011937 | A1 | 1/2015 |
| WO | 2015012042 | A1 | 1/2015 |
| WO | 2016009768 | A1 | 1/2016 |

OTHER PUBLICATIONS

Satoshi Ujiie et al., "Conductivity of 70Li2S—30P2S5 glasses and glass-ceramics added with lithium halides", Solid State Ionics, Oct. 1, 2014, pp. 57-61, vol. 263.

Sylvain Boulineau et al, "Mechanochemical synthesis of Li-argyrodite Li6PS5X (X=Cl, Br, I) as sulfur-based solid electrolytes for all solid state batteries application", Solid State Ionics, Aug. 3, 2012, pp. 1-5, vol. 221.

Takashi Hakari et al., "All-solid-state lithium batteries with Li3PS4 glass as active materia", Journal of Power Sources, Oct. 20, 2015, pp. 721-725, vol. 293.

* cited by examiner

SOLID ELECTROLYTE FOR ALL-SOLID LITHIUM SECONDARY BATTERY, ALL-SOLID LITHIUM SECONDARY BATTERY, AND METHOD OF PREPARING THE SOLID ELECTROLYTE

CROSS-REFERENCE TO RELATED APPLICATIONS

This application claims the benefits of and priority to Japanese Patent Application No. 2017-0219084, filed on Nov. 14, 2017, in the Japan Patent Office; and Korean Patent Application No. 2018-0129354, filed on Oct. 26, 2018, in the Korean Patent Office; and all the benefits accruing therefrom under 35 U.S.C. § 119, the contents of which are incorporated herein in their entirety by reference.

BACKGROUND

1. Field

The present disclosure relates to a solid electrolyte for an all-solid secondary battery, an all-solid secondary battery, and a method of preparing the solid electrolyte.

2. Description of the Related Art

As an alternative to a non-aqueous electrolyte for a secondary battery, an all-solid secondary battery including a solid electrolyte has been examined for use as a secondary battery. Since the all-solid secondary battery is entirely solid, there is no combustible organic solvent contained in the battery. As such, the all-solid secondary battery using the solid electrolyte is considered to have better safety properties as compared with a secondary battery using a non-aqueous electrolyte.

The solid electrolyte used in an all-solid secondary battery can have a lower ion conductivity than that of a non-aqueous electrolyte. Thus, research and development are underway to increase an ion conductivity of a solid electrolyte. Recently, a solid electrolyte having an argyrodite crystal structure (hereinafter, referred to as "an argyrodite solid electrolyte") has been examined as promising, since an argyrodite solid electrolyte has a relatively high ion conductivity (for example, about $10^{-4}$ S/cm to $10^{-3}$ S/cm). An argyrodite solid electrolyte is known, for example in Japanese Patent No. 2016-24874, International Patent Publication No. WO 2016/009768, Japanese Patent No. 5957144, International Patent Publication No. WO 2015/011937, International Patent Publication No. WO 2015/012042, Japanese Patent No. 2011-96630, and Japanese Patent No. 2015-72783. The solid electrolyte having an argyrodite crystal structure was found to have an undesirably high activation energy of, for example, 30 kilojoules per mole (kJ/mol) or greater. Having a high activation energy results in poor temperature stability, thus the characteristics of argyrodite solid electrolytes can vary significantly depending on the use temperature.

Accordingly, there remains a need for an improved solid electrolyte that is stable with respect to lithium, has suitable ion conductivity and activation energy, and is stable at various temperatures of use.

SUMMARY

In this regard, the present disclosure provides an all-solid secondary battery using a solid electrolyte for an all-solid secondary battery and a method of preparing the solid electrolyte, wherein the solid electrolyte is capable of lowering an activation energy while maintaining a high ion conductivity of a solid electrolyte having an argyrodite crystal structure.

Additional aspects will be set forth in part in the description which follows and, in part, will be apparent from the description, or may be learned by practice of the presented embodiments.

According to an aspect of an embodiment, there is provided a solid electrolyte for an all-solid secondary battery, the solid electrolyte having a composition represented by Formula (1):

$$Li_{7-x}PS_{6-x}Br_x \qquad (1),$$

wherein, $1.2<x<1.75$, the solid electrolyte has an argyrodite crystal structure, and the solid electrolyte has at least one peak at a position of $29.65\pm0.50°$ $2\theta$ when analyzed by X-ray diffraction using CuKα radiation.

In an embodiment, x in Formula (1) may satisfy a range of $1.23\leq x\leq 1.5$.

In an embodiment, the solid electrolyte may further satisfy (IB/IA)<0.5, wherein IA is the maximum intensity of the peak at a position of $29.65°\pm0.50°$ $2\theta$ and IB is the maximum intensity of the peak at a position of $28.00°\pm0.50°$ $2\theta$ when analyzed by X-ray diffraction using CuKα radiation.

In an embodiment, IB/IA may be less than 0.1.

In an embodiment, the solid electrolyte may lower an activation energy while maintaining a high ion conductivity thereof.

In an embodiment, the solid electrolyte may have peaks at positions of $25.16°\pm0.50°$ $2\theta$, $29.65°\pm0.50°$ $2\theta$, $30.94°\pm0.50°$ $2\theta$, $44.36°\pm0.50°$ $2\theta$, $47.22°\pm0.50°$ $2\theta$, and $51.75°$ $2\theta\pm0.50°$ $2\theta$ when analyzed by X-ray diffraction.

In an embodiment, the solid electrolyte for the all-solid secondary battery may have an activation energy of about 29 kilojoules per mole (kJ/mole) or less.

In an embodiment, the solid electrolyte for the all-solid secondary battery may have an ion conductivity of about $1.6\times10^{-3}$ Siemens per centimeter (S/cm) or greater at a temperature of 27° C.

According to an aspect of another embodiment, there is provided a composite electrode including an electrode active material and a first solid electrolyte that is the above-described solid electrolyte.

In an embodiment, the electrode active material may be a positive electrode active material or a negative electrode active material.

In an embodiment, the composite electrode may further include a second solid electrolyte that is different from the first solid electrolyte.

In an embodiment, the composite electrode may further include a sulfide solid electrolyte.

According to an aspect of another embodiment, there is provided an all-solid secondary battery including: a positive electrode layer; a negative electrode layer; and a solid electrolyte layer disposed between the positive electrode layer and the negative electrode layer and comprising a first solid electrolyte that is the above-described solid electrolyte.

In an embodiment, the positive electrode layer may include a positive electrode active material, and the positive electrode active material may include a lithium ternary transition metal oxide having layered rock-salt structure.

In an embodiment, the lithium ternary transition metal oxide may be represented by $LiNi_xCo_yAl_zO_2$ or $LiNi_xCo_yMn_zO_2$, wherein x, y, and z may satisfy $0<x<1$, $0<y<1$, $0<z<1$, and $x+y+z=1$.

In an embodiment, the negative electrode layer includes a negative electrode active material, and the negative electrode active material may include at least one of lithium metal, a metal that is alloyable with lithium, or a carbonaceous material.

In an embodiment, the negative electrode active material comprises: lithium (Li), indium (In), aluminum (Al), tin (Sn), silicon (Si), artificial graphite, graphite carbon fiber, resin-sintered carbon, pyrolytic vapor-grown carbon, coke, mesocarbon microbead (MCMB), furfuryl alcohol, polyacene, pitch-based carbon fiber, vapor-grown carbon fiber, natural graphite, non-graphitizable carbon, or a combination thereof.

In an embodiment, the solid electrolyte layer may further include a second solid electrolyte that is different from the first solid electrolyte.

In an embodiment, the solid electrolyte layer may further include a sulfide solid electrolyte.

In an embodiment, the solid electrolyte may increase temperature stability of the all-solid secondary battery.

According to an aspect of another embodiment, there is provided a method of preparing a solid electrolyte, the method including: mechanically milling a mixture including $Li_2S$, $P_2S_5$, and LiBr at a mixing ratio corresponding to Formula (1) to obtain a glass-state composite; and heat-treating the glass-state composite at a glass transition temperature or greater of the glass-state composite to convert the glass-state composite to an ionic conductive glass ceramic and obtain the solid electrolyte, wherein the solid electrolyte has a composition represented by Formula (1):

$$Li_{7-x}PS_{6-x}Br_x \qquad (1),$$

wherein 1.2<x<1.75.

In an embodiment, the mechanical milling may be performed at a temperature of about 25° C. and in an inert atmosphere.

In an embodiment, the mechanical milling may be performed by a planetary ball mill.

In an embodiment, the mechanical milling using the planetary ball mill may be performed at a rotation rate of about 50 to about 600 rpm, for 0.1 to 50 hours.

In an embodiment, a temperature at which the heat treatment is performed is in a range of about 250° C. to about 450° C.

In an embodiment, the method may further include cooling the ionic conductive glass ceramic after performing the heat-treating of the glass-state composite to obtain the solid electrolyte.

In an embodiment, the solid electrolyte may have an argyrodite crystal structure.

In an embodiment, the solid electrolyte, which provides a reduced activation energy while maintaining a high ion conductivity of an argyrodite-type solid electrolyte, may be easily and reliably prepared.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
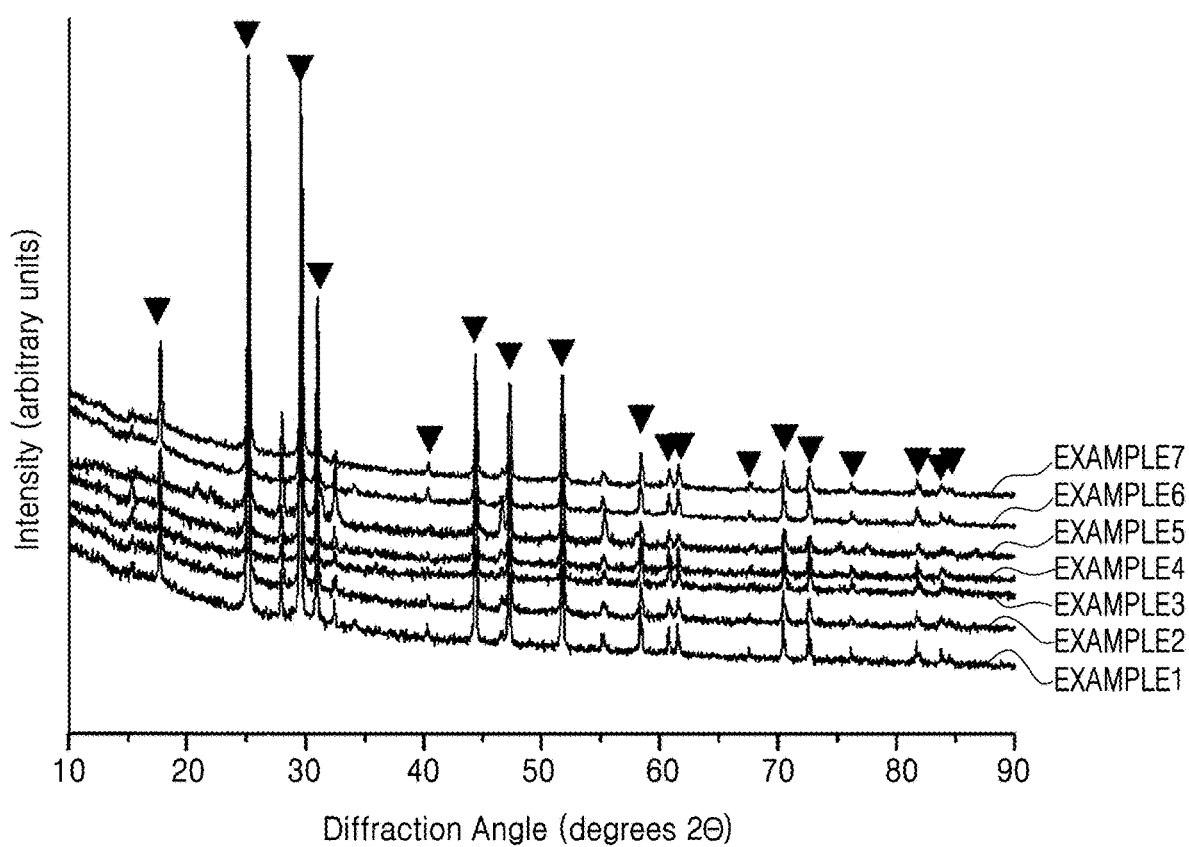
FIG. 1 is a graph of intensity (arbitrary units (au)) versus diffraction angle (degrees 2-theta (2θ)) showing the results of X-ray diffraction measurements using CuKα radiation performed on solid electrolytes prepared according to Examples 1-7 of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. Expressions such as "at least one of," when preceding a list of elements, modify the entire list of elements and do not modify the individual elements of the list.

If not defined otherwise, all terms (including technical and scientific terms) in the specification may be defined as commonly understood by one skilled in the art. The terms defined in a generally-used dictionary may not be interpreted ideally or exaggeratedly unless clearly defined. In addition, unless explicitly described to the contrary, the word "comprise" and variations such as "comprises" or "comprising" will be understood to imply the inclusion of stated elements but not the exclusion of any other elements.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

In the drawings, the thickness of layers, films, panels, regions, etc., are exaggerated for clarity. Similar reference numerals designate similar elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Hereinafter, an embodiment will be described in further detail by explaining exemplary embodiments with reference to the accompanying drawings. In addition, like reference numerals in the present specification and drawings denote like elements, and thus their description may be omitted to limit repetition. The descriptions of the embodiments are provided herein as examples but are not intended to limit the equivalent or the use thereof.

Configuration of the Solid Electrolyte

First, a configuration of a solid electrolyte according to an embodiment will be described. The solid electrolyte according to an embodiment may have a composition represented by Formula (1):

$$Li_{7-x}PS_{6-x}Br_x \quad \text{Formula (1)}$$

wherein $1.2 < x < 1.75$.

Any suitable subrange may be selected from the range of $1.2 < x < 1.75$. For example, x may have a lower limit of 1.23 or greater, 1.25 or greater, or 1.5 or greater, but embodiments of the present disclosure are not limited thereto. In an embodiment, $1.23 < x < 1.75$, $1.25 < x < 1.75$, or $1.5 < x < 1.75$. When x satisfies the conditions above, an ion conductivity of the solid electrolyte may be increased, and at the same time, an activation energy of the solid electrolyte may be lowered.

In the solid electrolyte having the composition represented by Formula (1), a sulfur (S) atom in the compound $Li_7PS_6$ are substituted with bromine (Br) atom(s) to provide $Li_{7-x}PS_{6-x}Br_x$ having substantially the same crystal structure as $Li_7PS_6$. The solid electrolyte may have an argyrodite crystal structure. X-ray diffraction using CuKα radiation may be performed to determine whether the solid electrolyte has an argyrodite crystal structure. The argyrodite crystal structure is a tetrahedrally close-packed cubic unit cell with space group F4-3m. Structural features include an anion framework of interpenetrating, centered icosahedra providing ideal and distorted tetrahedral cation sites. For the solid electrolyte having the composition represented by Formula (I), lithium atoms and phosphorus atoms fill tetrahedral interstices, forming a network of isolated $PS_4^{3-}$ tetrahedra and $LiS_4^{3-}$ tetrahedra within this close-packed structure.

In an embodiment, when the solid electrolyte is analyzed by X-ray diffraction using CuKα radiation, at least one peak may appear at a position of 29.65±0.50° 2θ in the X-ray diffraction spectrum. In an embodiment, peaks may appear at positions of 25.16°±0.50° 2θ, 29.65°±0.50° 2θ, 30.94°±0.50° 2θ, 44.36°±0.50° 2θ, 47.22°±0.50° 2θ, and 51.75°±0.50° 2θ when analyzed by X-ray diffraction. When the solid electrolyte has peaks at these positions when analyzed by X-ray diffraction, the solid electrolyte may have an argyrodite crystal structure.

Then, when the maximum intensity of the peak at the position of 29.65°±0.50° 2θ is referred to as IA, and the maximum intensity of the peak at position of 28.00°±0.50° 2θ is referred to as IB, the ratio peak intensity IB/IA may be less than 0.5. In an embodiment, IB/IA may be less than 0.1, and in this regard, the characteristics of the solid electrolyte may be further improved. Here, the peak at IA may be a peak corresponding to the argyrodite crystal structure as described above. The peak at IB may correspond to an impurity peak. Thus, as IB/IA decreases, the characteristics (in detail, ion conductivity, or the like) of the solid electrolyte may be improved. In an embodiment, IB may be 0. FIG. 1, which is described in detail below, shows the results of X-ray diffraction analysis of the solid electrolyte.

As such, the solid electrolyte according to an embodiment may have an argyrodite crystal structure, and may be a composition represented by Formula (1). Accordingly, the solid electrolyte according to an embodiment may have a low activation energy while having an excellent ion conductivity.

The solid electrolyte according to an embodiment may have an ion conductivity in a range of about $1.6 \times 10^{-3}$ Siemens per centimeter (S/cm) to about $5.5 \times 10^{-3}$ S/cm, for example, about $1.7 \times 10^{-3}$ S/cm to about $5.5 \times 10^{-3}$ S/cm, about $1.8 \times 10^{-3}$ S/cm to about $5.5 \times 10^{-3}$ S/cm, about $1.9 \times 10^{-3}$ S/cm to about $5.5 \times 10^{-3}$ S/cm, about $2.0 \times 10^{-3}$ S/cm to about $5.5 \times 10^{-3}$ S/cm, about $2.1 \times 10^{-3}$ S/cm to about $5.5 \times 10^{-3}$ S/cm, about $2.2 \times 10^{-3}$ S/cm to about $5.5 \times 10^{-3}$ S/cm, about $2.3 \times 10^{-3}$ S/cm to about $5.5 \times 10^{-3}$ S/cm, about $2.4 \times 10^{-3}$ S/cm to about $5.5 \times 10^{-3}$ S/cm, about $2.5 \times 10^{-3}$ S/cm to about $5.5 \times 10^{-3}$ S/cm, about $2.6 \times 10^{-3}$ S/cm to about $5.5 \times 10^{-3}$ S/cm, about $2.7 \times 10^{-3}$ S/cm to about $5.5 \times 10^{-3}$ S/cm, about $2.8 \times 10^{-3}$ S/cm to about $5.5 \times 10^{-3}$ S/cm, or about $2.9 \times 10^{-3}$ S/cm to about $5.5 \times 10^{-3}$ S/cm, as measured at 27° C.

Applicants have surprisingly discovered that when the sulfur (S) atoms in the compound $Li_7PS_6$ are substituted with bromine (Br) atom(s), as in Formula (1), the resulting solid electrolyte has an activation energy that is reduced from about 35 kilojoules per mole (kJ/mol) to less than about 30 kJ/mol. While not wanting to be bound by theory, it is believed that the activation energy is reduced because the substitution(s) by bromine atoms reduces the electrical conductivity without significantly affecting the ionic conductivity.

The solid electrolyte according to an embodiment may have an activation energy of less than about 30 kJ/mol, for example, about 29 kJ/mol or less, about 28.9 kJ/mol or less, about 28.8 kJ/mol, about 28.7 kJ/mol or less, about 28.6 kJ/mol or less, about 28.5 kJ/mol or less, about 28.4 kJ/mol or less, about 28.3 kJ/mol or less, about 28.2 kJ/mol or less, about 28.1 kJ/mol or less, about 28.0 kJ/mol or less, about 27.5 kJ/mol or less, about 27.0 kJ/mol or less, about 26.5 kJ/mol or less, about 26.0 kJ/mol or less, or about 25.5 kJ/mol or less.

Configuration of all-Solid Secondary Battery

Figure 2:
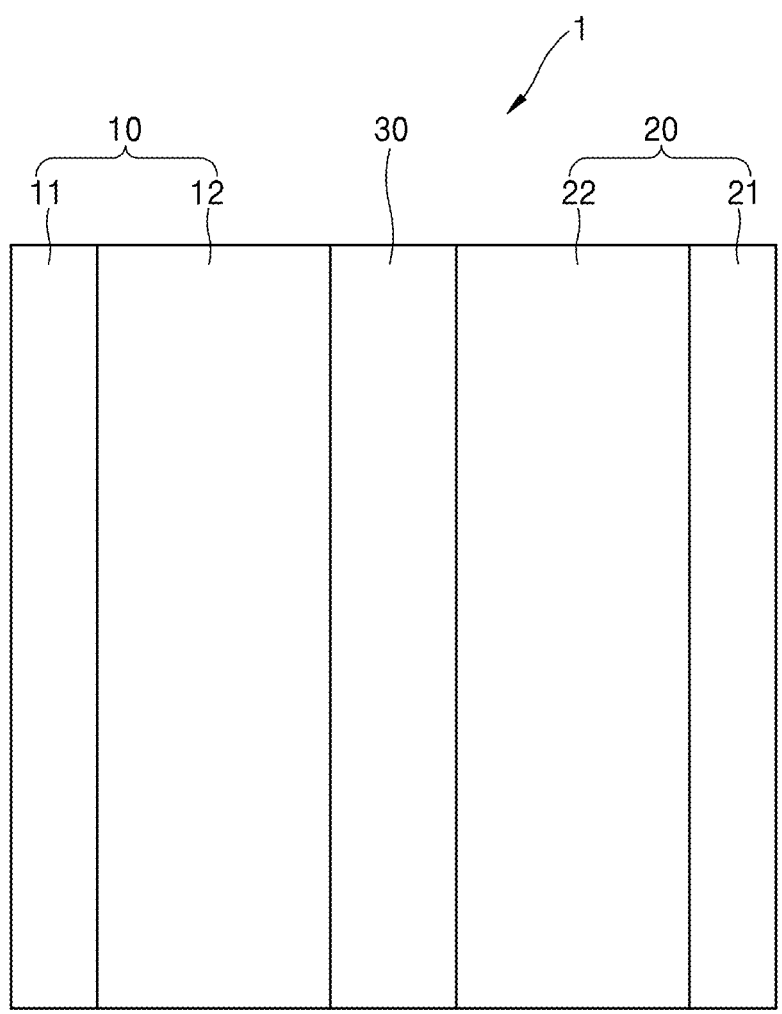
FIG. 2 is a schematic diagram of an all-solid secondary battery according to an embodiment.

Next, by referring to FIG. 2, a configuration of an all-solid secondary battery 1 according to an embodiment will be described.

Configuration of Positive Electrode Layer 10

A positive electrode layer 10 may have a positive electrode current collector 11 and a positive electrode active material layer 12. The positive electrode current collector 11 may be a platelet type or a thin film type, and each may include indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. In an embodiment, use of the positive electrode current collector 11 may be omitted.

The positive electrode active material layer 12 may include a positive electrode active material and a solid electrolyte, so as to constitute a composite positive electrode. In an embodiment, the solid electrolyte included in the positive electrode active material layer 12 may be the solid electrolyte having the composition represented by Formula (1) (also referred to herein as "the solid electrolyte of Formula (1)" for convenience) according to an embodiment. Alternatively, the solid electrolyte included in the positive electrode active material layer 12 may be a mixture of the solid electrolyte of Formula (1) and a solid electrolyte that is different from the solid electrolyte of Formula (1) according to an embodiment. An example of the solid electrolyte that is different from the solid electrolyte of Formula (1) according to an embodiment will be described below. In addition, the solid electrolyte of Formula (1) according to an embodiment may be included in one or more of the positive electrode layer 10, a negative electrode layer 20, and a solid electrolyte layer 30, wherein one or more of the solid electrolytes or mixtures of solid electrolytes in each of these layers may include the solid electrolyte of Formula (1) according to an embodiment.

The positive electrode active material may be a material capable of reversibly intercalating and deintercalating lithium ions.

For example, the positive electrode active material may be at least one composite oxide of lithium and a metal selected from Co, Mn, Ni, and a combination thereof. For example, the positive electrode active material may be a compound represented by one of the following formulae: $Li_aA_{1-b}B^1{}_bD^1{}_2$ (where $0.90 \leq a \leq 1.8$ and $0 \leq b \leq 0.5$); $Li_aE_{1-b}B^1{}_bO_{2-c}D^1{}_c$ (where $0.90 \leq a \leq 1.8$, $0 \leq b \leq 0.5$, and $0 \leq c \leq 0.05$); $LiE_{2-b}B^1{}_bO_{4-c}D^1{}_c$ (where $0 \leq b \leq 0.5$, $0 \leq c \leq 0.05$); $Li_aNi_{1-b-c}Co_bB^1{}_cD^1{}_\alpha$ (where $0.90 \leq a \leq 1.8$, $0 \leq b \leq 0.5$, $0 \leq c \leq 0.05$, $0 < \alpha \leq 2$); $Li_aNi_{1-b-c}Co_bB^1{}_cO_{2-\alpha}F^1{}_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB^1{}_cO_{2-\alpha}F^1{}_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB^1{}_cD^1{}_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB^1{}_cO_{2-\alpha}F^1{}_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB^1{}_cO_{2-\alpha}F^1{}_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiI^1O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae above, A may be nickel (Ni), cobalt (Co), manganese (Mn), and combinations thereof; $B^1$ may be aluminum (Al), nickel (Ni), cobalt (Co), manganese (Mn), chromium (Cr), iron (Fe), magnesium (Mg), strontium (Sr), vanadium (V), a rare earth element, or a combination thereof; $D^1$ may be oxygen (O), fluorine (F), sulfur (S), phosphorus (P), or a combination thereof; E may be cobalt (Co), manganese (Mn), or a combination thereof; $F^1$ may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; $I^1$ may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

For example, the positive electrode active material may be formed of a lithium salt, such as a lithium cobalt oxide (LCO), a lithium nickel oxide, a lithium nickel cobalt oxide, a lithium nickel cobalt aluminum (NCA) oxide, a lithium nickel cobalt manganese (NCM) oxide, a lithium manganese oxide, a lithium iron phosphate, a nickel sulfide, a copper sulfide, sulfur, an iron oxide, a vanadium oxide, or a combination thereof. The positive electrode active material may be used alone or as a combination of at least two selected therefrom.

In addition, the positive electrode active material may be formed by including, among the above-described lithium salts, a lithium salt of a transition metal oxide having a layered rock-salt structure. Here, the term "layered" as used herein refers to a thin-layered shape, and the term "rock-salt structure" as used herein refers to a sodium chloride-type structure as a crystal structure. In detail, the layered rock-salt structure refers to a structure in which a face-centered cubic lattices respectively formed by each of cations and anions are shifted by half the side of each unit lattice.

An example of the lithium salt of the transition metal oxide having the layered rock-salt structure may include a lithium salt of a ternary transition metal oxide, such as $LiNi_xCo_yAl_zO_2$ (NCA) or $LiNi_xCo_yMn_zO_2$ (NCM) (wherein $0<x<1$, $0<y<1$, $0<z<1$, and $x+y+z=1$).

When the positive electrode active material includes a lithium salt of a ternary transition metal oxide having the above-described layered rock-salt structure, an all-solid secondary battery 1 may have improved energy density and thermal stability.

The positive electrode active material may be covered with a coating layer. Here, for use as the coating layer according to an embodiment, any suitable coating layer, including known coating layers for a positive electrode active material of an all-solid secondary battery may be used. An example of the coating layer may be $Li_2O$—$ZrO_2$.

In an embodiment, the positive electrode active material may be composed of a lithium salt of a ternary transition metal oxide, such as NCA or NCM. When Ni is included as the positive electrode active material, the capacity density of the all-solid secondary battery 1 may be increased while the metal elution from the positive electrode active material in a charged state may be reduced. Accordingly, the all-solid battery 1 according to an embodiment may have improved long-term reliability and cycle characteristics in a charged state and/or while charging.

Here, the positive electrode active material may have a shape that is, for example, a spherical particle shape or an oval particle shape. In addition, an average particle diameter D50 of the positive electrode active material is not particularly limited, and may be in a range applicable to a positive electrode active material for an all-solid secondary battery. In addition, an amount of the positive electrode active material for the positive electrode layer 10 is not particularly limited, and may be in a range applicable to a positive electrode active material for an all-solid secondary battery 1.

In addition, to prepare the positive electrode layer 10, additives, such as a conductive agent, a binder, a filler, a dispersant, or an ion conductive agent, may be appropriately mixed as well as the positive electrode active material and the solid electrolyte that are described above.

For use as a conductive agent available for the positive electrode layer 10, for example, graphite, graphite, carbon black, acetylene black, Ketjen black, carbon fiber, or metallic powder may be used. In addition, for use as a binder available for the positive electrode layer 10, for example, styrene butadiene rubber (SBR), polytetrafluoroethylene, polyvinylidene fluoride, or polyethylene may be used. Next, for use as a filler, a dispersant, or an ion conductive agent available for the positive electrode layer 10, a known material generally used in an electrode of the all-solid secondary battery may be used.

Negative Electrode Layer

A negative electrode layer 20 may include a negative electrode current collector 21 and a negative electrode active material layer 22. The negative electrode current collector 21 may be, for example, a platelet type or a thin film type, each consisting of In, Cu, Mg, stainless steel, Ti, Fe, Co, Ni, Zn, Al, Ge, Li, or an alloy thereof. The use of the negative electrode current collector 21 may be omitted.

The negative electrode active material layer 22 may include a negative electrode active material and a solid electrolyte, so as to constitute a composite negative electrode. The negative electrode active material may have a lower charge/discharge voltage than that of the positive electrode active material, and may be composed of the negative electrode active material comprising one or more selected from lithium metal, a metal or metalloid that is alloyable with lithium, and a carbonaceous material. Examples of the negative electrode active material may include metal or metalloid, and a carbonaceous material. The metal or metalloid may include, for example, Li, In, Al, Sn, Si, or an alloy thereof. The carbonaceous material may include, for example, artificial graphite, graphite carbon fiber, resin-sintered carbon, pyrolytic vapor-grown carbon, coke, mesocarbon microbead (MCMB), furfuryl alcohol, polyacene, pitch-based carbon fiber, vapor-grown carbon fiber, natural graphite, and non-graphitizable carbon. The negative electrode active material may be used alone or as a combination of at least two selected therefrom.

The solid electrolyte included in the negative electrode active material layer 22 may be the solid electrolyte of Formula (1) according to an embodiment. Alternatively, the solid electrolyte included in the negative electrode active material layer 22 may be with a mixture of the solid electrolyte of Formula (1) and a solid electrolyte that is different from the solid electrolyte of Formula (1) according to an embodiment. To prepare the negative electrode layer 20, additives, such as a conductive agent, a binder, a filler, a dispersant, or an ion conductive agent, may be appropriately mixed as well as the negative electrode active material and the solid electrolyte. The additives added to the negative electrode layer 20 may be the same as those added to the above-described positive electrode layer 10.

Solid Electrolyte Layer

The solid electrolyte layer 30 may include a solid electrolyte between the positive electrode layer 10 and the negative electrode layer 20. The solid electrolyte layer 30 may further include a binder. The solid electrolyte included in the solid electrolyte layer 30 may be the solid electrolyte of Formula (1) according to an embodiment. Alternatively, the solid electrolyte included in the solid electrolyte layer 30 may be a mixture of the solid electrolyte of Formula (1) and a second solid electrolyte that is different from the solid electrolyte of Formula (1).

In an embodiment, the second solid electrolyte may be, for example, a sulfide solid electrolyte. The sulfide solid electrolyte may be, for example, $aLi_2S$-$(1-a)P_2S_5$ wherein $0<a<1$, $aLi_2S$-$bP_2S_5$-$cLiX$ (where X is a halogen atom, e.g., F, Cl, Br, I, or a combination thereof, wherein $0<a<1$, $0<b<1$, $0<c<1$, and $a+b+c=1$, $aLi_2S$-$bP_2S_5$-$cLi_2O$ wherein $0<a<1$, $0<b<1$, $0<c<1$, and $a+b+c=1$, $aLi_2S$-$bP_2S_5$-$cLi_2O$-$dLiI$ wherein $0<a<1$, $0<b<1$, $0<c<1$, $0<d<1$ and $a+b+c+d=1$, $aLi_2S$-$(1-a)SiS_2$ wherein $0<a<1$, $aLi_2S$-$bSiS_2$-$cLiI$ $0<a<1$, $0<b<1$, $0<c<1$, and $a+b+c=1$, $aLi_2S$-$bSiS_2$-$cLiBr$ wherein $0<a<1$, $0<b<1$, $0<c<1$, and $a+b+c=1$, $aLi_2S$-$bSiS_2$-$cLiCl$ wherein $0<a<1$, $0<b<1$, $0<c<1$, and $a+b+c=1$, $aLi_2S$-$bSiS_2$-$cB_2S_3$-$dLiI$ wherein $0<a<1$, $0<b<1$, $0<c<1$, $0<d<1$ and $a+b+c+d=1$, $aLi_2S$-$bSiS_2$-$cP_2S_5$-$dLiI$ wherein $0<a<1$, $0<b<1$, $0<c<1$, $0<d<1$ and $a+b+c+d=1$, $aLi_2S$-$(1-a)B_2S_3$ wherein $0<a<1$, $aLi_2S$-$bP_2S_5$-$cZ_mS_n$ (where m and n are each independently positive integers between 1 and 10, Z is Ge, Zn, or Ga, and wherein $0<a<1$, $0<b<1$, $0<c<1$, and $a+b+c=1$), $aLi_2S$-$(1-a)GeS_2$ wherein $0<a<1$, $aLi_2S$-$bSiS_2$-$cLi_3PO_4$ wherein $0<a<1$, $0<b<1$, $0<c<1$, and $a+b+c=1$, and $aLi_2S$-$bSiS_2$-$cLi_pMO_q$ (where p and q are each independently positive integers between 1 and 10, wherein $0<a<1$, $0<b<1$, $0<c<1$, and $a+b+c=1$, and M may be P, Si, Ge, B, Al, Ga, In). Here, the sulfide solid electrolyte may be prepared by treating a starting material (for example, $Li_2S$ or $P_2S_5$) of the sulfide solid electrolyte according to a dissolution quenching method or a mechanical milling. In addition, following such treatment, sintering may be further performed on the resulting sulfide solid electrolyte. When the additional sintering is performed, the sulfide solid electrolyte may become more rigid.

The all-solid secondary battery 1 according to an embodiment may include the solid electrolyte according to an embodiment, and accordingly, may exhibit high characteristics in a wide temperature range.

Preparation Method of all-Solid Secondary Battery

Next, a method of preparing the all-solid secondary battery 1 will be described. The all-solid secondary battery 1 may be fabricated after a positive electrode layer 10, a negative electrode layer 20, and a solid electrolyte layer 30 are prepared according to the method described below, and then stacking the prepared layers.

Manufacturing Process of Solid Electrolyte

The solid electrolyte according to an embodiment may be prepared according to the following preparation method. First, mechanical milling treatment may be performed to mix $Li_2S$, $P_2S_5$, and LiBr at a mixing ratio corresponding to Formula (1) above, thereby obtaining a glass-state composite. Here, the mechanical milling treatment may be performed using a planetary ball mill at a rotation rate in a range of about 50 rpm to about 600 rpm, for 0.1 to 50 hours, and along with 1 kg of 1 to 100 kWh/raw material mixture. In an embodiment, the mechanical milling is performed at a temperature of about 25° C. and in an inert atmosphere, for example an argon atmosphere. Accordingly, the solid electrolyte may be prepared more easily and reliably.

Then, the glass-state composite thus obtained may be subjected to heat treatment at a glass transition temperature or greater of the composite to convert the glass-state composite to ionic conductive glass ceramic. Such ionic conductive glass ceramic corresponds to the solid electrolyte according to an embodiment. Then, the ionic conductive glass ceramic may be cooled down, thereby obtaining a solid electrolyte. The solid electrolyte thus obtained may be pulverized to a desired degree, and then, used for the preparation of the all-solid secondary battery 1. Here, a temperature at which the heat treatment is performed is not particularly limited so long as the temperature is greater than the glass transition temperature of the glass-state composite. The glass transition temperature of the glass-state composite according to an embodiment may be about 200° C., and in this regard, the temperature at which the heat treatment (heat-treating) may be performed is in a range of about 250° C. to about 450° C., and for example, about 350° C. to about 450° C. As the heat treatment temperature increases, the ion conductivity of the solid electrolyte tends to increase.

Preparation Method of Positive Electrode Layer

The positive electrode layer 10 may be prepared according to any suitable method, including a known preparation method. For example, materials (for example, a positive electrode active material, a solid electrolyte, a binder, and the like) constituting the positive electrode active material layer 12 may be added to a non-polar solvent to prepare a slurry (also referred to as a slurry paste). The slurry thus obtained may be spread over the positive electrode current collector 11, and then, dried. The resulting stacked layers may be roll-milled, so as to prepare the positive electrode layer 10. In another embodiment, a mixture of materials constituting the positive electrode active material layer 12 may be subjected to consolidation-molding into pellets or may be subjected to stretching into a sheet, so as to prepare the positive electrode layer 10. When the positive electrode layer 10 is prepared by these methods, the use of the positive electrode current collector 11 may be omitted.

Manufacturing Process of Negative Electrode Layer

First, materials (for example, a negative electrode active material, a solid electrolyte, a binder, and the like) constituting the negative electrode active material layer 22 may be added to a non-polar solvent to prepare a slurry. Then, the slurry thus obtained may be spread over the negative electrode current collector 21, and then, dried. The resulting stacked layers may be rolled under pressure, so as to prepare the negative electrode layer 20. In another embodiment, a mixture of materials constituting the negative electrode active material layer 22 may be subjected to consolidation-molding into pellets or may be subjected to stretching into a sheet, so as to prepare the negative electrode layer 20. When the negative electrode layer 20 is prepared by these methods, the use of the negative electrode current collector 21 may be omitted.

Manufacturing Process of Solid Electrolyte Layer

The solid electrolyte may be subjected to film formation by using a known film-forming method, such as a blasting method, an aerosol deposition method, a cold spray method, a sputtering method, a chemical vapor deposition (CVD) method, a spray method, and the like, so as to prepare the solid electrolyte layer 30. Then, the solid electrolyte layer 30 may further be subjected to pressing the solid electrolyte assembly. In another embodiment, the solid electrolyte layer 30 may be also prepared by mixing the solid electrolyte with a solvent, a binder, or a support, and pressing the mixture. Here, the binder or the support may be added for the purpose of reinforcing the integrity of the solid electrolyte layer 30 or preventing short circuit of a solid electrolyte layer 30.

Preparation of all-Solid Secondary Battery

The positive electrode layer 10, the negative electrode layer 20, and the solid electrolyte layer 30 that are prepared by the above-described method may be stacked so as to sandwich the solid electrolyte layer 30 between the positive electrode layer 10 and the negative electrode layer 20, and then, roll-milled, thereby preparing the all-solid secondary battery 1 according to an embodiment.

EXAMPLES

Example 1

Preparation of Solid Electrolyte

First, reagents of $Li_2S$, $P_2S_5$, and LiBr were measured to correspond to the structure of the desired composition ($Li_{5.75}PS_{4.75}Br_{1.25}$), and a mechanical milling treatment was performed thereon to mix the raw materials in a planetary ball mill for 20 hours. The mechanical milling treatment was performed at a rotation rate of 380 rpm, at room temperature (ca. 25° C.), and in an argon atmosphere.

300 mg of a powder sample (i.e., a glass-state composite) having a composition of $Li_{5.75}PS_{4.75}Br_{1.25}$ as obtained from the mechanical milling treatment was pressed (at a pressure of about 400 mega pascals per square centimeter (MPa/$cm^2$)) to obtain a pellet having a diameter of about 13 millimeters (mm) and a thickness of about 0.8 mm. The pellet thus obtained was coated with a gold film, and additionally placed into a carbon furnace. Accordingly, a sample for heat treatment was prepared. The sample thus obtained was vacuum-sealed by using a quartz glass tube. Then, a temperature of the vacuum-sealed sample was increased from room temperature to a temperature of 450° C. using an electric furnace at a heating rate of 1.0° C./min, heat-treated at a temperature of 450° C. for 6 hours, and then cooled to room temperature at a cooling rate of 1.0° C./min, thereby obtaining a mass body of a solid electrolyte. The collected mass body was pulverized by using an agate mortar to obtain a sample (a solid electrolyte) of Example 1. X-ray powder diffraction was performed on the solid electrolyte, and formation of the desired crystals having an Argyrodite crystal structure in the solid electrolyte was confirmed. FIG. 1 shows the results of the X-ray diffraction analysis. The X-ray diffraction analysis of Example 1 revealed peaks at the above-described positions of 25.16°±0.50° 2θ, 29.65°±0.50° 2θ, 30.94°±0.50° 2θ, 44.36°±0.50° 2θ, 47.22°±0.50° 2θ, and 51.75°±0.50° 2θ that are consistent for a solid electrolyte of Formula (1).

In addition, a base line was removed from the X-ray diffraction data (i.e., diffraction spectrum) measured by this method. Subsequently, when the maximum intensity of the peak at 29.65°±0.5° 2θ was referred to as IA and the maximum intensity of the peak at 28.0°±0.5° 2θ was referred to as IB, IB/IA was measured as 0.07.

Evaluation of Characteristics of Solid Electrolyte

The ion conductivity of the solid electrolyte thus obtained was measured as follows. The solid electrolyte was pressed (at a pressure of 400 MPa/$cm^2$) to prepare a pellet. Then, an In foil (having a thickness of 500 μm) was provided on both surfaces of the pellet to prepare a pellet for measuring ion conductivity. By using an alternating current impedance measuring device, the ion conductivity of the pellet was measured at 27° C. The pellet for measuring ion conductivity exhibited an ion conductivity of $1.8 \times 10^{-3}$ Siemens per centimeter (S/cm) at a temperature of 27° C. In addition, the ion conductivity was measured while changing the temperature to 27° C., 40° C., 50° C., 60° C., 70° C., and 80° C., and an activation energy was calculated from the results. Consequently, the solid electrolyte had an activation energy of 26.4 kilojoules per mole (kJ/mol).

Example 2

A solid electrolyte was prepared in the same manner as in Example 1, except that the temperature at which the heat treatment was performed was changed to 350° C. The X-ray diffraction measurement was performed on the solid electrolyte, and the presence of the desired crystals having an argyrodite crystal structure in the solid electrolyte was confirmed. The results of the X-ray diffraction analysis are shown in FIG. 1. The X-ray diffraction analysis of Example 2 revealed peaks at the above-described positions that are consistent with a solid electrolyte of Formula (1). In addition, as a result of measuring IB/IA in the same manner as in Example 1, the IB/IA was 0.08. In addition, an ion conductivity of the solid electrolyte was measured in the same manner as in Example 1, and the ion conductivity of the solid electrolyte was $3.1 \times 10^{-3}$ S/cm at 27° C. Consequently, as a result of calculating an activation energy in the same manner as in Example 1, the solid electrolyte had an activation energy of 25.2 kJ/mol.

Example 3

A solid electrolyte was prepared in the same manner as in Example 1, except that the desired composition was $Li_{5.50}PS_{4.50}Br_{1.50}$. The X-ray diffraction measurement was performed on the solid electrolyte, and the presence of the desired crystals having an argyrodite crystal structure in the solid electrolyte was confirmed. The results of the X-ray diffraction analysis are shown in FIG. 1. The X-ray diffraction analysis of Example 3 revealed peaks at the above-described positions that are consistent with a solid electrolyte of Formula (1). In addition, as a result of measuring IB/IA in the same manner as in Example 1, IB/IA was 0.08. In addition, an ion conductivity of the solid electrolyte was measured in the same manner as in Example 1, and the ion conductivity of the solid electrolyte was $5.5 \times 10^{-3}$ S/cm at 27° C. In addition, as a result of calculating an activation energy in the same manner as in Example 1, the solid electrolyte had an activation energy of 28.4 kJ/mol.

Example 4

A solid electrolyte was prepared in the same manner as in Example 3, except that the temperature at which the heat treatment was performed was changed to 350° C. The X-ray diffraction measurement was performed on the solid electrolyte, and the presence of the desired crystals having an argyrodite crystal structure in the solid electrolyte was confirmed. The results of the X-ray diffraction analysis are shown in FIG. 1. The X-ray diffraction analysis of Example 4 revealed peaks at the above-described positions that are consistent with a solid electrolyte of Formula (1). In addition, as a result of measuring IB/IA in the same manner as in Example 1, IB/IA was 0.09. In addition, an ion conductivity of the solid electrolyte was measured in the same manner as in Example 1, and the ion conductivity of the solid electrolyte was $3.6 \times 10^{-3}$ S/cm at 27° C. In addition, as a result of calculating an activation energy in the same manner as in Example 1, the solid electrolyte had an activation energy of 28.4 kJ/mol.

Example 5

A solid electrolyte was prepared in the same manner as in Example 3, except that the temperature at which the heat treatment was performed was changed to 250° C. The X-ray diffraction measurement was performed on the solid electrolyte, and the presence of the desired crystals having an argyrodite crystal structure in the solid electrolyte was confirmed. The results of the X-ray diffraction analysis are shown in FIG. 1. The X-ray diffraction analysis of Example 5 revealed peaks at the above-described positions that are consistent with a solid electrolyte of Formula (1). In addition, as a result of measuring IB/IA in the same manner as in Example 1, IB/IA was 0.43. In addition, an ion conductivity of the solid electrolyte was measured in the same manner as in Example 1, and the ion conductivity of the solid electrolyte was $2.3 \times 10^{-3}$ S/cm at 27° C. In addition, as a result of calculating an activation energy in the same manner as in Example 1, the solid electrolyte had an activation energy of 28.8 kJ/mol.

Example 6

A solid electrolyte was prepared in the same manner as in Example 1, except that the desired composition was $Li_{5.77}PS_{4.77}Br_{1.23}$. The X-ray diffraction measurement was performed on the solid electrolyte, and the presence of the desired crystals having an argyrodite crystal structure in the solid electrolyte was confirmed. The results of the X-ray diffraction analysis are shown in FIG. 1. The X-ray diffraction analysis of Example 6 revealed peaks at the above-described positions that are consistent with a solid electrolyte of Formula (1). In addition, as a result of measuring IB/IA in the same manner as in Example 1, IB/IA was 0.07. In addition, an ion conductivity of the solid electrolyte was measured in the same manner as in Example 1, and the ion conductivity of the solid electrolyte was $1.7 \times 10^{-3}$ S/cm at 27° C. In addition, as a result of calculating an activation energy in the same manner as in Example 1, the solid electrolyte had an activation energy of 27.1 kJ/mol.

Example 7

A solid electrolyte was prepared in the same manner as in Example 6, except that the temperature at which the heat treatment was performed was changed to 350° C. The X-ray diffraction measurement was performed on the solid electrolyte, and the presence of the desired crystals having an argyrodite structure in the solid electrolyte was confirmed. The results of the X-ray diffraction analysis are shown in FIG. 1. The X-ray diffraction analysis of Example 7 revealed peaks at the above-described positions that are consistent with a solid electrolyte of Formula (1). In addition, as a result of measuring IB/IA in the same manner as in Example 1, IB/IA was 0.05. In addition, an ion conductivity of the solid electrolyte was measured in the same manner as in Example 1, and the ion conductivity of the solid electrolyte was $1.6 \times 10^{-3}$ S/cm at 27° C. In addition, as a result of calculating an activation energy in the same manner as in Example 1, the solid electrolyte had an activation energy of 26.0 kJ/mol.

Comparative Example 1

Figure 3:
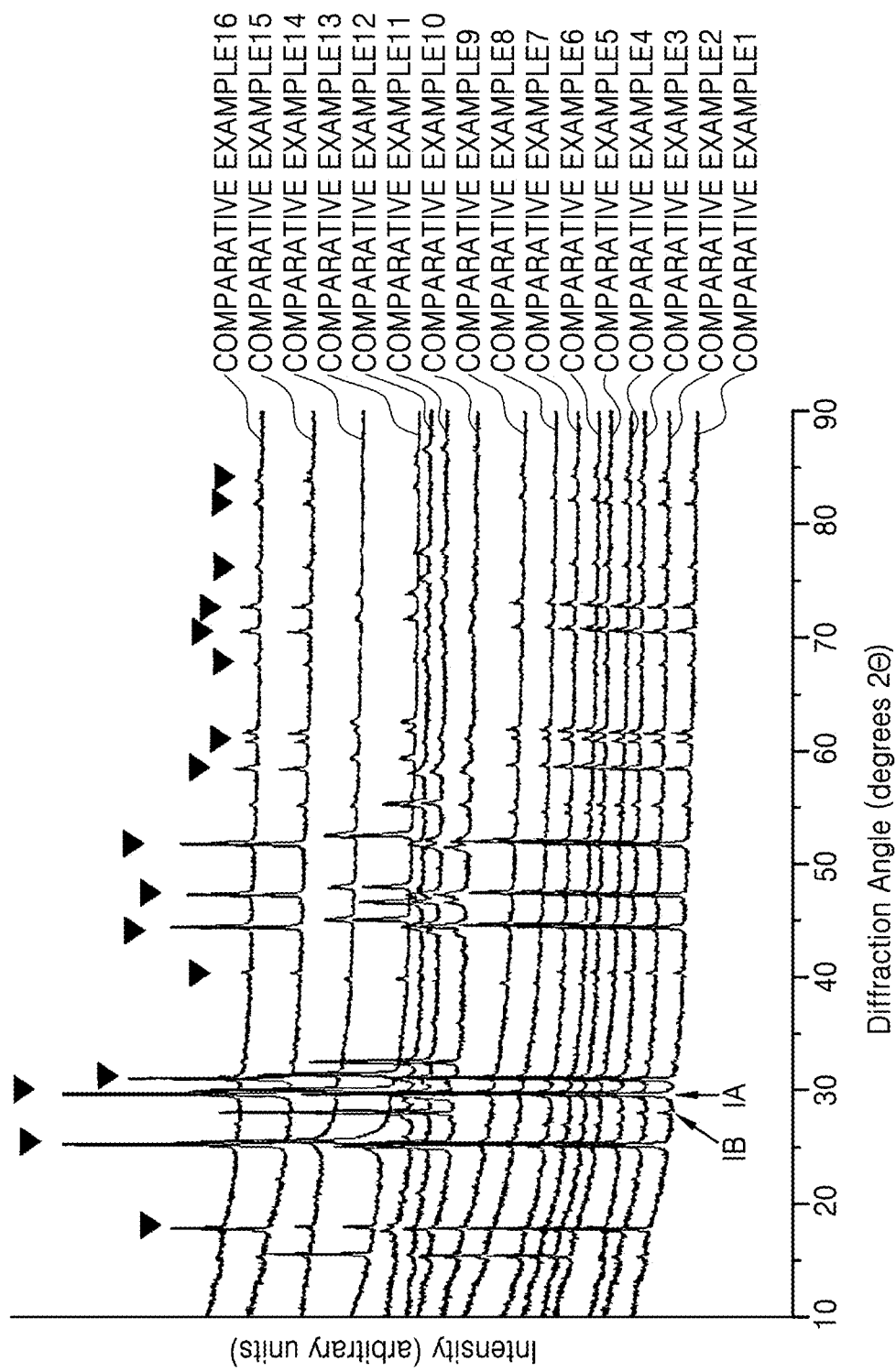
FIG. 3 is a graph intensity (au) versus diffraction angle (2θ) showing the results of X-ray diffraction measurements using CuKα radiation performed on solid electrolytes prepared according to Comparative Examples 1-16 of the present disclosure.

A solid electrolyte was prepared in the same manner as in Example 1, except that the composition of the solid electrolyte was $Li_{6.00}PS_{5.00}Br_{1.00}$ and the temperature at which the heat treatment was performed was changed to 550° C. The X-ray diffraction measurement was performed on the solid electrolyte, and the presence of crystals having an argyrodite crystal structure in the solid electrolyte was confirmed. The results of the X-ray diffraction analysis are shown in FIG. 3. The X-ray diffraction analysis of Comparative Example 1 revealed peaks similar to those of Example 1 at the above-described positions, however the solid electrolyte composition of Comparative Example 1 did not satisfy 1.2<x<1.75 in Formula (1). In addition, as a result of measuring IB/IA in the same manner as in Example 1, IB/IA was 0.04. In addition, an ion conductivity of the solid electrolyte was measured in the same manner as in Example 1, and the ion conductivity of the solid electrolyte was $5.7 \times 10^{-4}$ S/cm at 27° C. In addition, as a result of calculating an activation energy in the same manner as in Example 1, the solid electrolyte had an activation energy of 35.4 kJ/mol.

Comparative Example 2

A solid electrolyte was prepared in the same manner as in Comparative Example 1, except that the temperature at which the heat treatment was performed was changed to 450° C. The X-ray diffraction measurement was performed on the solid electrolyte, and the presence of crystals having an argyrodite crystal structure in the solid electrolyte was confirmed. The results of the X-ray diffraction analysis are shown in FIG. 3. The X-ray diffraction analysis of Comparative Example 2 had peaks similar to those of Example 1 at the above-described positions, however the solid electrolyte composition of Comparative Example 2 did not satisfy 1.2<x<1.75 in Formula (1). In addition, as a result of measuring IB/IA in the same manner as in Example 1, IB/IA was 0.03. In addition, an ion conductivity of the solid electrolyte was measured in the same manner as in Example 1, and the ion conductivity of the solid electrolyte was $1.7 \times 10^{-3}$ S/cm at 27° C. In addition, as a result of calculating an activation energy in the same manner as in Example 1, the solid electrolyte had an activation energy of 31.2 kJ/mol.

Comparative Example 3

A solid electrolyte was prepared in the same manner as in Comparative Example 1, except that the temperature at which the heat treatment was performed was changed to 350° C. The X-ray diffraction measurement was performed on the solid electrolyte, and the presence of crystals having an argyrodite crystal structure in the solid electrolyte was confirmed. The results of the X-ray diffraction analysis are shown in FIG. 3. The X-ray diffraction spectrum of Comparative Example 3 had peaks similar to those of Example 1 at the above-described positions, however the solid electrolyte composition of Comparative Example 3 did not satisfy 1.2<x<1.75 in Formula (1). In addition, as a result of measuring IB/IA in the same manner as in Example 1, IB/IA was 0.02. In addition, an ion conductivity of the solid electrolyte was measured in the same manner as in Example 1, and the ion conductivity of the solid electrolyte was $1.0 \times 10^{-3}$ S/cm at 27° C. In addition, as a result of calculating an activation energy in the same manner as in Example 1, the solid electrolyte had an activation energy of 31.1 kJ/mol.

Comparative Example 4

A solid electrolyte was prepared in the same manner as in Example 1, except that the desired composition was $Li_{6.25}PS_{5.25}Br_{0.75}$ and the temperature at which the heat treatment was performed was changed to 350° C. The X-ray diffraction measurement was performed on the solid electrolyte, and the presence of crystals having an argyrodite crystal structure in the solid electrolyte was confirmed. The results of the X-ray diffraction analysis shown in FIG. 3. The X-ray diffraction spectrum of Comparative Example 4 had peaks similar to those of Example 1 at the above-described positions, however the solid electrolyte composition of Comparative Example 4 did not satisfy 1.2<x<1.75 in Formula (1). In addition, as a result of measuring IB/IA in the same manner as in Example 1, IB/IA was 0.00. In addition, an ion conductivity of the solid electrolyte was measured in the same manner as in Example 1, and the ion conductivity of the solid electrolyte was $1.9 \times 10^{-3}$ S/cm at 27° C. In addition, as a result of calculating an activation energy in the same manner as in Example 1, the solid electrolyte had an activation energy of 31.7 kJ/mol.

Comparative Example 5

A solid electrolyte was prepared in the same manner as in Comparative Example 1, except that the temperature at which the heat treatment was performed was changed to 250° C. The X-ray diffraction measurement was performed on the solid electrolyte, and the presence of crystals having an argyrodite crystal structure in the solid electrolyte was confirmed. The results of the X-ray diffraction analysis are shown in FIG. 3. The X-ray diffraction spectrum of Comparative Example 5 had peaks similar to those of Example 1 at the above-described positions, however the solid electrolyte composition of Comparative Example 5 did not satisfy 1.2<x<1.75 in Formula (1). In addition, as a result of measuring IB/IA in the same manner as in Example 1, IB/IA was 0.00. In addition, an ion conductivity of the solid electrolyte was measured in the same manner as in Example 1, and the ion conductivity of the solid electrolyte was $1.8 \times 10^{-3}$ S/cm at 27° C. In addition, as a result of calculating an activation energy in the same manner as in Example 1, the solid electrolyte had an activation energy of 30.8 kJ/mol.

Comparative Example 6

A solid electrolyte was prepared in the same manner as in Example 1, except that the desired composition was $Li_{6.50}PS_{5.50}Br_{0.50}$ and the temperature at which the heat treatment was performed was changed to 550° C. The X-ray diffraction measurement was performed on the solid electrolyte, and the presence of crystals having an argyrodite crystal structure in the solid electrolyte was confirmed. The results of the X-ray diffraction analysis are shown in FIG. 3. The X-ray diffraction analysis of Comparative Example 6 had peaks similar to those of Example 1 at the above-described positions, however the solid electrolyte composition of Comparative Example 6 did not satisfy 1.2<x<1.75 in Formula (1). In addition, as a result of measuring IB/IA in the same manner as in Example 1, IB/IA was 0.00. In addition, an ion conductivity of the solid electrolyte was measured in the same manner as in Example 1, and the ion conductivity of the solid electrolyte was $1.3 \times 10^{-3}$ S/cm at 27° C. In addition, as a result of calculating an activation energy in the same manner as in Example 1, the solid electrolyte had an activation energy of 39.5 kJ/mol.

Comparative Example 7

A solid electrolyte was prepared in the same manner as in Comparative Example 6, except that the temperature at which the heat treatment was performed was changed to 450° C. The X-ray diffraction measurement was performed on the solid electrolyte, and the presence of crystals having an argyrodite crystal structure in the solid electrolyte was confirmed. The results of the X-ray diffraction analysis are shown in FIG. 3. The X-ray diffraction analysis of Comparative Example 7 had peaks similar to those of Example 1 at the above-described positions, however the solid electrolyte composition of Comparative Example 7 did not satisfy 1.2<x<1.75 in Formula (1). In addition, as a result of measuring IB/IA in the same manner as in Example 1, IB/IA was 0.00. In addition, an ion conductivity of the solid electrolyte was measured in the same manner as in Example 1, and the ion conductivity of the solid electrolyte was $1.2 \times 10^{-3}$ S/cm at 27° C. In addition, as a result of calculating an activation energy in the same manner as in Example 1, the solid electrolyte had an activation energy of 39.8 kJ/mol.

Comparative Example 8

A solid electrolyte was prepared in the same manner as in Example 1, except that the desired composition was $Li_{6.75}PS_{5.75}Br_{0.25}$ and the temperature at which the heat treatment was performed was changed to 550° C. The X-ray diffraction measurement was performed on the solid electrolyte, and the presence of crystals having an argyrodite crystal structure in the solid electrolyte was confirmed. The results of the X-ray diffraction analysis are shown in FIG. 3. The X-ray diffraction analysis of Comparative Example 8 had peaks similar to those of Example 1 at the above-described positions, however the solid electrolyte composition of Comparative Example 8 did not satisfy 1.2<x<1.75 in Formula (1). In addition, as a result of measuring IB/IA in the same manner as in Example 1, IB/IA was 0.00. In addition, an ion conductivity of the solid electrolyte was measured in the same manner as in Example 1, and the ion conductivity of the solid electrolyte was $6.8 \times 10^{-4}$ S/cm at 27° C. In addition, as a result of calculating an activation energy in the same manner as in Example 1, the solid electrolyte had an activation energy of 44.7 kJ/mol.

Comparative Example 9

A solid electrolyte was prepared in the same manner as in Comparative Example 8, except that the temperature at which the heat treatment was performed was changed to 450° C. The X-ray diffraction measurement was performed on the solid electrolyte, and the presence of crystals having an argyrodite crystal structure in the solid electrolyte was confirmed. The results of the X-ray diffraction analysis are shown in FIG. 3. The X-ray diffraction analysis of Comparative Example 9 had peaks similar to those of Example 1 at the above-described positions, however the solid electrolyte composition of Comparative Example 9 did not satisfy 1.2<x<1.75 in Formula (1). In addition, as a result of measuring IB/IA in the same manner as in Example 1, IB/IA was 0.00. In addition, an ion conductivity of the solid electrolyte was measured in the same manner as in Example 1, and the ion conductivity of the solid electrolyte was $7.9 \times 10^{-4}$ S/cm at 27° C. In addition, as a result of calculating an activation energy in the same manner as in Example 1, the solid electrolyte had an activation energy of 41.1 kJ/mol.

Comparative Example 10

A solid electrolyte was prepared in the same manner as in Example 1, except that the desired composition was $Li_{5.25}PS_{4.25}Br_{1.75}$. The X-ray diffraction measurement was performed on the solid electrolyte, and the presence of crystals having an argyrodite crystal structure in the solid electrolyte was confirmed. The results of the X-ray diffraction analysis are shown in FIG. 3. The X-ray diffraction analysis of Comparative Example 10 had peaks similar to those of Example 1 at the above-described positions, however the solid electrolyte composition of Comparative Example 10 did not satisfy 1.2<x<1.75 in Formula (1). In addition, as a result of measuring IB/IA in the same manner as in Example 1, IB/IA was 0.29. In addition, an ion conductivity of the solid electrolyte was measured in the same manner as in Example 1, and the ion conductivity of the solid electrolyte was $7.9 \times 10^{-4}$ S/cm at 27° C. In addition, as a result of calculating an activation energy in the same manner as in Example 1, the solid electrolyte had an activation energy of 41.1 kJ/mol.

Comparative Example 11

A solid electrolyte was prepared in the same manner as in Comparative Example 10, except that the temperature at which the heat treatment was performed was changed to 350° C. The X-ray diffraction measurement was performed on the solid electrolyte, and the presence of crystals having an argyrodite crystal structure in the solid electrolyte was confirmed. The results of the X-ray diffraction analysis are shown in FIG. 3. The X-ray diffraction analysis of Comparative Example 11 had peaks similar to those of Example 1 at the above-described positions, however the solid electrolyte composition of Comparative Example 11 did not satisfy 1.2<x<1.75 in Formula (1). In addition, as a result of measuring IB/IA in the same manner as in Example 1, IB/IA was 0.66. In addition, an ion conductivity of the solid electrolyte was measured in the same manner as in Example 1, and the ion conductivity of the solid electrolyte was $7.1 \times 10^{-4}$ S/cm at 27° C. In addition, as a result of calculating an activation energy in the same manner as in Example 1, the solid electrolyte had an activation energy of 44.6 kJ/mol.

Comparative Example 12

A solid electrolyte was prepared in the same manner as in Comparative Example 10, except that the temperature at which the heat treatment was performed was changed to 250° C. The X-ray diffraction measurement was performed on the solid electrolyte, and the presence of crystals having an argyrodite crystal structure in the solid electrolyte was confirmed. The results of the X-ray diffraction analysis are shown in FIG. 3. The X-ray diffraction analysis of Comparative Example 12 had peaks similar to those of Example 1 at the above-described positions, however the solid electrolyte composition of Comparative Example 12 did not satisfy 1.2<x<1.75 in Formula (1). In addition, as a result of measuring IB/IA in the same manner as in Example 1, IB/IA was 2.81. In addition, an ion conductivity of the solid electrolyte was measured in the same manner as in Example 1, and the ion conductivity of the solid electrolyte was $5.2 \times 10^{-4}$ S/cm at 27° C. In addition, as a result of calculating an activation energy in the same manner as in Example 1, the solid electrolyte had an activation energy of 50.1 kJ/mol.

Comparative Example 13

A solid electrolyte was prepared in the same manner as in Example 1, except that reagents of $Li_2S$, $P_2S_5$, and LiCl were measured to form the desired composition having the formula $Li_{5.75}PS_{4.75}Cl_{1.25}$ and the temperature at which the heat treatment was performed was changed to 550° C. The X-ray diffraction measurement was performed on the solid electrolyte, and the presence of crystals having an argyrodite crystal structure in the solid electrolyte was confirmed. The results of the X-ray diffraction analysis are shown in FIG. 3. The X-ray diffraction analysis of Comparative Example 13 had peaks similar to those of Example 1 at the above-described positions, however the solid electrolyte composition of Comparative Example 13 was not a composition represented by Formula (1). In addition, as a result of measuring IB/IA in the same manner as in Example 1, IB/IA was 0.00. In addition, an ion conductivity of the solid electrolyte was measured in the same manner as in Example 1, and the ion conductivity of the solid electrolyte was $2.3 \times 10^{-3}$ S/cm at room temperature. In addition, as a result of calculating an activation energy in the same manner as in Example 1, the solid electrolyte had an activation energy of 37.0 kJ/mol.

Comparative Example 14

A solid electrolyte was prepared in the same manner as in Example 1, except that reagents of $Li_2S$, $P_2S_5$, $Na_2S$, and LiCl were measured to form the desired composition of the formula $(Li_{5.69}Na_{0.06})PS_{4.75}Cl_{1.25}$ and the temperature at which the heat treatment was performed was changed to 550° C. The X-ray diffraction measurement was performed on the solid electrolyte, and the presence of crystals having an argyrodite crystal structure in the solid electrolyte was confirmed. The results of the X-ray diffraction analysis are shown in FIG. 3. The X-ray diffraction analysis of Comparative Example 14 had peaks similar to those of Example 1 at the above-described positions, however the solid electrolyte composition of Comparative Example 14 was not a composition represented by Formula (1). In addition, as a result of measuring IB/IA in the same manner as in Example 1, IB/IA was 0.00. In addition, an ion conductivity of the solid electrolyte was measured in the same manner as in Example 1, and the ion conductivity of the solid electrolyte was $5.1 \times 10^{-3}$ S/cm at 27° C. In addition, as a result of calculating an activation energy in the same manner as in Example 1, the solid electrolyte had an activation energy of 34.0 kJ/mol.

Comparative Example 15

A solid electrolyte was prepared in the same manner as in Example 1, except that the desired composition was $Li_{5.80}PS_{4.80}Br_{1.20}$ and the temperature at which the heat treatment was performed was changed to 450° C. The X-ray diffraction measurement was performed on the solid electrolyte, and the presence of crystals having an argyrodite crystal structure in the solid electrolyte was confirmed. The results of the X-ray diffraction analysis are shown in FIG. 3. The X-ray diffraction analysis of Comparative Example 14 had peaks similar to those of Example 1 at the above-described positions, however the solid electrolyte composition of Comparative Example 15 did not satisfy $1.2<x<1.75$ in Formula (1). In addition, as a result of measuring IB/IA in the same manner as in Example 1, IB/IA was 0.4. In addition, an ion conductivity of the solid electrolyte was measured in the same manner as in Example 1, and the ion conductivity of the solid electrolyte was $1.7 \times 10^{-3}$ S/cm at 27° C. In addition, as a result of calculating an activation energy in the same manner as in Example 1, the solid electrolyte had an activation energy of 30.0 kJ/mol.

Comparative Example 16

A solid electrolyte was prepared in the same manner as in Comparative Example 15, except that the temperature at which the heat treatment was performed was changed to 350° C. The X-ray diffraction measurement was performed on the solid electrolyte, and the presence of crystals having an argyrodite crystal structure in the solid electrolyte was confirmed. The results of the X-ray diffraction analysis are shown in FIG. 3. The X-ray diffraction analysis of Comparative Example 16 had peaks similar to those of Example 1 at the above-described positions, however the solid electrolyte composition of Comparative Example 15 did not satisfy $1.2<x<1.75$ in Formula (1). In addition, as a result of measuring IB/IA in the same manner as in Example 1, IB/IA was 0.05. In addition, an ion conductivity of the solid electrolyte was measured in the same manner as in Example 1, and the ion conductivity of the solid electrolyte was $1.3 \times 10^{-3}$ S/cm at 27° C. In addition, as a result of calculating an activation energy in the same manner as in Example 1, the solid electrolyte had an activation energy of 30.2 kJ/mol.

The properties of Examples 1-7 and Comparative Examples 1-16 are provided in Tables 1 to 4 and arranged according to heat treatment temperature.

TABLE 1

| | Formula | Temperature (° C.) | Ion Conductivity (S/cm) | Activation Energy (kJ/mol) |
|---|---|---|---|---|
| Example 1 | $Li_{5.75}PS_{4.75}Br_{1.25}$ | 450 | $1.8 \times 10^{-3}$ | 26.4 |
| Example 3 | $Li_{5.50}PS_{4.50}Br_{1.50}$ | 450 | $5.5 \times 10^{-3}$ | 28.4 |
| Example 6 | $Li_{5.77}PS_{4.77}Br_{1.23}$ | 450 | $1.7 \times 10^{-3}$ | 27.1 |
| Comparative Example 2 | $Li_{6.00}PS_{5.00}Br_{1.00}$ | 450 | $1.7 \times 10^{-3}$ | 31.2 |
| Comparative Example 7 | $Li_{6.50}PS_{5.50}Br_{0.50}$ | 450 | $1.2 \times 10^{-3}$ | 39.8 |
| Comparative Example 9 | $Li_{6.75}PS_{5.75}Br_{0.25}$ | 450 | $7.9 \times 10^{-4}$ | 41.1 |
| Comparative Example 10 | $Li_{5.25}PS_{4.25}Br_{1.75}$ | 450 | $7.9 \times 10^{-4}$ | 41.1 |
| Comparative Example 15 | $Li_{5.80}PS_{4.80}Br_{1.20}$ | 450 | $1.7 \times 10^{-3}$ | 30.0 |

TABLE 2

| | Formula | Temperature (° C.) | Ion Conductivity (S/cm) | Activation Energy (kJ/mol) |
|---|---|---|---|---|
| Example 2 | $Li_{5.75}PS_{4.75}Br_{1.25}$ | 350 | $3.1 \times 10^{-3}$ | 25.2 |
| Example 4 | $Li_{5.50}PS_{4.50}Br_{1.50}$ | 350 | $3.6 \times 10^{-3}$ | 28.4 |
| Example 7 | $Li_{5.77}PS_{4.77}Br_{1.23}$ | 350 | $1.6 \times 10^{-3}$ | 26.0 |
| Comparative Example 3 | $Li_{6.00}PS_{5.00}Br_{1.00}$ | 350 | $1.0 \times 10^{-3}$ | 31.1 |
| Comparative Example 4 | $Li_{6.25}PS_{5.25}Br_{0.75}$ | 350 | $1.9 \times 10^{-3}$ | 31.7 |
| Comparative Example 11 | $Li_{5.25}PS_{4.25}Br_{1.75}$ | 350 | $7.1 \times 10^{-4}$ | 44.6 |
| Comparative Example 16 | $Li_{5.80}PS_{4.80}Br_{1.20}$ | 350 | $1.3 \times 10^{-3}$ | 30.2 |

TABLE 3

| | Formula | Temperature (° C.) | Ion Conductivity (S/cm) | Activation Energy (kJ/mol) |
|---|---|---|---|---|
| Example 5 | $Li_{5.50}PS_{4.50}Br_{1.50}$ | 250 | $2.3 \times 10^{-3}$ | 28.8 |
| Comparative Example 5 | $Li_{6.25}PS_{5.25}Br_{0.75}$ | 250 | $1.8 \times 10^{-3}$ | 30.8 |
| Comparative Example 12 | $Li_{5.25}PS_{4.25}Br_{1.75}$ | 250 | $5.2 \times 10^{-4}$ | 50.1 |

TABLE 4

| | Formula | Temperature (° C.) | Ion Conductivity (S/cm) | Activation Energy (kJ/mol) |
|---|---|---|---|---|
| Comparative Example 1 | $Li_{6.00}PS_{5.00}Br_{1.00}$ | 550 | $5.7 \times 10^{-4}$ | 35.4 |
| Comparative Example 6 | $Li_{6.50}PS_{5.50}Br_{0.50}$ | 550 | $1.3 \times 10^{-3}$ | 39.5 |
| Comparative Example 8 | $Li_{6.75}PS_{5.75}Br_{0.25}$ | 550 | $6.8 \times 10^{-4}$ | 44.7 |
| Comparative Example 13 | $Li_{5.75}PS_{4.75}Cl_{1.25}$ | 550 | $2.3 \times 10^{-3}$ | 37.0 |
| Comparative Example 14 | $Li_{5.69}Na_{0.06}PS_{4.75}Cl_{1.25}$ | 550 | $5.1 \times 10^{-3}$ | 34.0 |

Evaluation

In comparing Examples 1-7 with Comparative Examples 1-16, the solid electrolytes prepared according to Examples 1-7 satisfy the requirements of Formula (1) and have a high solid electrolyte ion conductivity ($1.6 \times 10^{-3}$ S/cm or greater) and a low activation energy (less than 30 kJ/mol). Meanwhile, the solid electrolytes prepared according to Comparative Examples 1-16 do not satisfy the requirements of the solid electrolyte according to Formula (1). In further detail, the solid electrolytes prepared according to Comparative Examples 1-17 had a high ion conductivity, but also had an increased activation energy (about 30 kJ/mol more). Therefore, all solid electrolytes prepared according to Examples 1-7 are expected to exhibit excellent characteristics over a wide temperature range.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A solid electrolyte for all-solid secondary battery, wherein the solid electrolyte has a composition represented by Formula (1):

$$Li_{7-x}PS_{6-x}Br_x \qquad (1),$$

wherein 1.2<x<1.75, the solid electrolyte has an argyrodite crystal structure, and the solid electrolyte has at least one peak at a position of 29.65±0.50° 2θ when analyzed by X-ray diffraction using CuKα radiation.

2. The solid electrolyte of claim 1, wherein x in Formula (1) satisfies a range of 1.23≤x≤1.5.

3. The solid electrolyte of claim 1, wherein the solid electrolyte further satisfies (IB/IA)<0.5, wherein IA is a maximum intensity of the peak at the position of 29.65°±0.50° 2θ, and IB is a maximum intensity of a peak at a position of 28.00°±0.50° 2θ when analyzed by X-ray diffraction using CuKα radiation.

4. The solid electrolyte of claim 3, wherein IB/IA is less than 0.1.

5. The solid electrolyte of claim 1, wherein the solid electrolyte has peaks at positions of 25.16°±0.50° 2θ, 29.65°±0.50° 2θ, 30.94°±0.50° 2θ, 44.36°±0.50° 2θ, 47.22°±0.50° 2θ, and 51.75°±0.50° 2θ when analyzed by X-ray diffraction using CuKα radiation.

6. The solid electrolyte of claim 1, wherein the solid electrolyte has an activation energy of about 29 kilojoules per mole or less.

7. The solid electrolyte of claim 1, wherein the solid electrolyte has an ion conductivity of about $1.6 \times 10^{-3}$ Siemens per centimeter or greater at a temperature of 27° C.

8. A composite electrode comprising an electrode active material and a first solid electrolyte that is the solid electrolyte of claim 1.

9. The composite electrode of claim 8, wherein the electrode active material is a positive electrode active material or a negative electrode active material.

10. The composite electrode of claim 8, further comprising a second solid electrolyte, wherein the second solid electrolyte is different from the first solid electrolyte.

11. The composite electrode of claim 8, further comprising a sulfide solid electrolyte.

12. An all-solid secondary battery comprising:
a positive electrode layer;
a negative electrode layer; and
a solid electrolyte layer disposed between the positive electrode layer and the negative electrode layer and comprising a first solid electrolyte that is the solid electrolyte of claim 1.

13. The all-solid secondary battery of claim 12, wherein the positive electrode layer comprises a positive electrode active material, and
the positive electrode active material comprises a lithium ternary transition metal oxide having a layered rock-salt structure.

14. The all-solid secondary battery of claim 13, wherein the lithium ternary transition metal oxide is represented by $LiNi_xCo_yAl_zO_2$ or $LiNi_xCo_yMn_zO_2$,
wherein 0<x<1, 0<y<1, 0<z<1, and x+y+z=1.

15. The all-solid secondary battery of claim 12, wherein the negative electrode layer comprises a negative electrode active material, and the negative electrode active material comprises at least one of lithium metal, a metal or metalloid alloyable with lithium, or a carbonaceous material.

16. The all-solid secondary battery of claim 15, wherein the negative electrode active material comprises lithium, indium, aluminum, tin, silicon, artificial graphite, graphite carbon fiber, resin-sintered carbon, pyrolytic vapor-grown carbon, coke, mesocarbon microbead, furfuryl alcohol, polyacene, pitch-based carbon fiber, vapor-grown carbon fiber, natural graphite, non-graphitizable carbon, or a combination thereof.

17. The all-solid secondary battery of claim 12, wherein the solid electrolyte layer further comprises a second solid electrolyte that is different from the first solid electrolyte.

18. The all-solid secondary battery of claim 12, wherein the solid electrolyte layer further comprises a sulfide solid electrolyte.

19. A method of preparing a solid electrolyte, the method comprising:
   mechanically milling a mixture comprising $Li_2S$, $P_2S_5$, and LiBr at a mixing ratio corresponding to Formula (1) to obtain a glass-state composite; and
   heat-treating the glass-state composite at a glass transition temperature or greater of the glass-state composite to convert the glass-state composite to an ionic conductive glass ceramic and obtain the solid electrolyte,
   wherein the solid electrolyte has a composition represented by Formula (1):

$$Li_{7-x}PS_{6-x}Br_x \qquad (1),$$

wherein $1.2 < x < 1.75$.

20. The method of claim 19, wherein the mechanical milling is performed at a temperature of about 25° C. and in an inert atmosphere.

21. The method of claim 19, wherein the mechanical milling is performed using a planetary ball mill.

22. The method of claim 21, wherein the mechanical milling using the planetary ball mill is performed at a rotation rate of about 50 to about 600 revolutions per minute, for about 0.1 to about 50 hours.

23. The method of claim 19, wherein a temperature at which the heat-treating of the glass-state composite is performed is in a range of about 250° C. to about 450° C.

24. The method of claim 19, further comprising cooling the ionic conductive glass ceramic after the heat-treating of the glass-state composite to obtain the solid electrolyte.

25. The method of claim 19, wherein the solid electrode has an argyrodite crystal structure.

* * * * *